Patented Jan. 31, 1928.

1,657,582

UNITED STATES PATENT OFFICE.

WILLIAM W. ODELL, OF MINNEAPOLIS, MINNESOTA.

HEAT-INSULATING MATERIAL AND THE PROCESS OF ITS MANUFACTURE.

No Drawing.   Application filed April 23, 1925.   Serial No. 25,429.

This invention relates to a porous or cellular refractory material and the process for producing it from clay, cements and the like, as a base, utilizing peat as a filler which latter is burned or carbonized during the processing.

The objects of this invention are: to prepare a "porous brick" or other "porous" refractory which will have pores or cells of very fine size, i. e. small; to prepare a refractory insulating material having void or porous space of a predetermined percentage, of controllable percentage, and having pores or cells of controllable size; and to prepare a porous refractory having a predetermined apparent specific gravity using peat in place of other vegetable filler.

It is not new to prepare porous refractory materials from clay by incorporating vegetable matter such as sawdust into the clay and then burning or carbonizing the sawdust during the firing operation. However, because a cheap material must be used for this purpose, it has been common practice to use sawdust as the filler; and since sawdust can not be obtained in an extremely fine state of subdivision the size of the pores in the refractory thus made are not controllable to the extent they would be if a filler of finer sized particles were used. I find that when peat containing moisture is well macerated with clay in the plastic condition, the peat is not only finely divided but uniformly disseminated throughout the mass. Attention is called to the fact that macerated wet peat is itself a plastic material which will retain its shape when molded even with 88 per cent of moisture; sawdust is not a plastic mass when so treated and will not either retain 88 per cent of moisture or hold its shape when molded wet and allowed to dry.

It is only in recent years that the value of small sized pores in a porous insulating medium has been recognized. It is a fact that the heat-insulating value of any porous insulating material having a definite amount of porous or cellular volume increases with decreasing average size of the pores or cells. This fact is utilized in the production of a porous refractory by my process. A matured peat when thoroughly macerated is composed of particles which in the main, will pass through a one hundred mesh standard screen; and when such a peat is mixed with plastic clay and the whole well macerated a plastic mass is obtained which upon molding into "shapes", drying and subsequently burning in a kiln yields a porous refractory in which the pores are of very small size. The percentage of porous or cellular space and therefore the apparent specific gravity of the refractory depends upon the percentage of the peat added to the clay. The percentage of peat most desired in the preparation of porous refractories by this process is not a constant quantity but depends upon the desired density—apparent specific gravity—of the finished product, and upon the tensile strength and crushing strength of the finished product. The quantity of peat which can be incorporated in clay to advantage depends also upon the nature of the peat used and upon the character of the clay. A larger percentage of peat can be incorporated in a clay with a high degree of plasticity or one containing much colloidal aluminum silicate than in a clay having a lesser degree of plasticity and containing a greater percentage of silica, lime, magnesia or the like and less aluminum silicate—kaolin. Normally a satisfactory porous brick can be made by incorporating twelve to twenty-four per cent of peat with the clay, macerating well, molding, drying and subsequently burning in a kiln until the refractory is sufficiently hard which is usually just below the fusion temperature and at about the softening temperature. With certain clays found in Minnesota this temperature is 1150 degrees to 1200 degrees centigrade. The percentages of peat incorporated and as given above are expressed in terms of dried peat and dried clay.

Now, when macerated peat is molded by itself and dried it sets to a hard brittle solid which cracks and checks and can readily be broken into pieces much smaller than a common brick hence there is a definite limit to the percentage of it which can be successfully used as a filler in the production of porous refractory without deleterious effects unless the peat is first prepared or unless a fibrous, less mature peat is used. With a clay which is not highly plastic the maximum quantity of mature peat which can be incorporated therein, in the production of a good grade of porous refractory, is approximately twelve to eighteen per cent by weight on the dry basis, and with a clay having a high degree of plasticity the maximum amount is approximately eighteen to twenty-four per cent. I find that when peat is so treated that it loses the property of being plastic when wet it not only can be used in larger percentages in the clay-mix or other plastic-mix but it tends to retain its volume upon drying. When peat is boiled either with or without the addition of alkaline-reacting materials and the boiled product is pressed or otherwise freed from excess of water, molded and allowed to dry, there is very little shrinkage in volume upon drying; this is because the colloidal properties are to a great extent destroyed. If peat of this character is employed as the filler, namely, is incorporated in the plastic mass of clay or other refractory by mixing prior to the molding and burning thereof, a very porous refractory can be made, being more porous and lower in apparent specific gravity with increasing percentages of peat thus incorporated.

The time required for boiling the peat varies somewhat but when an alkaline substance such as, sodium hydrate, liquid sodium silicate, sodium carbonate or the like is added to the peat less time is required for the suitable conditioning of the peat. There is a chemical and a solvent action of alkaline substances upon certain constituents of peat and this aids in the preparation of the peat, the dissolved portion is largely drained off with the excess water. Boiling under pressure also decreases the boiling time probably because of the higher temperature reached. My preference is to use a small percentage of an alkaline substance and heat the peat under pressure for ten to thirty minutes; eighty pounds pressure is usually sufficient for this purpose. After this operation the peat is drained and pressed free from excess of water. The water content can now be reduced to as low as fifty per cent if desired by the application of pressure; it will be noted that this can not be done with a wet peat prior to the heat-treating operation. When incorporating a large percentage of this kind of peat in a clay it is preferable to mix the two with as little maceration as possible.

The alkaline material used is selected with particular reference to the effect which the residual portion of it remaining in the pressed peat may have upon the particular clay used. It is known that clay in general is flocculated by acids and acid or neutral salts; small amounts of alkalis and alkaline salts deflocculate it whereas larger amounts cause flocculation. I find that when some alkali is present in the peat when mixed with clay the mixture is thinner or more readily worked than otherwise with the same amount of moisture. It is sometimes highly desirable to work the clay-peat mixture with the minimum percentage of water because of a tendency to crack upon drying when certain clays are used, and under these conditions alkali is used with the peat mixed into the clay. The alkali used may be caustic soda, silicate of soda, carbonate of soda or the like. The alkali used is usually neutralized by the acid bodies in the peat or absorbed by the peat and does not remain as such in the clay. When alkali is first added to a clay-peat mixture the first effect is a "thinning out" or an increase in the workability of the mixture, somewhat similar to the effect of adding water to it. Subsequently the alkali reacts with the organic acid-bodies in the peat and the mixture which may now be in molded form, becomes stiffer; upon burning in a kiln the peat is decomposed and actually burns quite completely, and the alkali exerts a further influence upon the character of the product which is important, namely, it lowers the fusion point of the clay and allows or causes the surface contacting it to become glazed at a much lower temperature than otherwise. Since peat has absorbent powers for the alkali and concentrates it within the clay mass it is evident that different effects can be obtained by altering the percentage of alkali used and by altering the degree of mixing of the clay with the peat. For example when flocculent peat is made strongly alkaline and is mixed with clay with as little maceration as possible the alkali is concentrated in what is subsequently the pores of the molded product; the walls of the pores have a lower melting point than the remaining portion of the brick and when a certain temperature is reached during the burning operation the pores close and become cells. The refractory made in this manner will not absorb water so readily as a refractory in which the voids are true pores.

I find that peat can be similarly incorporated in other materials than clay with similar results. For example, prepared peat can be mixed with Portland cement or certain other cementing materials and water, molded, and dried and the resulting product is a porous or cellular mass; burning the mass increases the percentage of void space and gives it a lower apparent specific gravity. The heating in such instances may or may not reach the stage of incipient fusion. In almost every case the maceration of the mixture improves the quality of the finished product unless a very large percentage of peat is employed, approaching fifty per cent on the dry weight basis, when it is sometimes advantageous to mix without maceration in order to prevent excessive cracking or checking upon drying.

The word "maceration" as used in this application and as commonly used in reference to the treatment of peat is not strictly in accordance with the dictionary definition.

Peat which has been milled in a Chilian mill is said to be macerated; likewise, peat which has been pugged and forced through small orifices is said to be macerated and the operation is called maceration. Prolonged pugging has a similar effect upon peat. The degree of maceration may be determined by letting a piece of the macerated peat dry in the air and observing the apparent specific gravity of the air-dried solid; peat which has been merely well mixed has a specific gravity of 0.7 to 0.9, peat which is only partly macerated has a specific gravity of 1.0 to 1.1 whereas peat which is thoroughly macerated has a specific gravity varying from 1.1 to 1.22. Further maceration does not appreciably increase the density which latter increases asymptotically toward a maximum of about 1.25 with prolonged maceration. In preparing macerated peat I prefer to pug it in a clay-working machine until thoroughly mixed, pass it between closely spaced rotating rollers and subsequently extrude it through an orifice or through a multiplicity of orifices.

When a large percentage of fairly well macerated peat is incorporated in a clay, more than twenty to twenty-four per cent, there is frequently a tendency for the plastic mixture to check and crack upon drying particularly when molded into the form of large slabs. The addition of grog is commonly resorted to as a means of preventing excess shrinkage when clay is worked alone, but I find that with peat-clay mixtures it is usually preferable to make numerous fine, deep indentures in the surface of the molded mass and that when this is done the tendency to crack is reduced almost to nil. The indentures may be lengthened until they are actual perforations without deleterious effect, in fact with beneficial effect, but this is not desirable when single layers are to be used as heat insulators. Numerous indentures of small diameter, not appreciably over one eighth of an inch average diameter is preferable to a lesser number of larger indentures; they may be made tapering, being larger at the surface, and from two opposite sides, and should preferably be staggered, that is, not directly opposite one another.

The term "cellular material", as used in the claims refers to a material which is either porous, cellular or both porous and cellular.

I claim:

1. A solid, cellular, non-combustible, heat-insulating material comprising the molded and subsequently dried and burned product resulting from the intimate mixture and maceration of plastic clay and prepared alkaline peat containing a certain maximum percentage of water; said percentage of water being only the amount required to give the mixture sufficient plasticity to be worked, macerated and molded.

2. A solid, cellular, non-combustible, heat-insulating material, comprising the molded, dried and subsequently burned product resulting from the intimate mixture of clay and prepared alkaline peat containing a certain maximum percentage of water; said percentage of water being sufficient only to give the mixture the desired plasticity.

3. A solid, cellular, non-combustible, heat-insulating material, comprising the molded and subsequently dried and burned product resulting from the mixture of prepared wet peat and plastic clay; said prepared peat consisting of peat which has been heated to a temperature higher than 200 degrees Fahrenheit in the presence of moisture but below the carbonization temperature and subsequently drained and freed from excess of water by compression.

4. A solid, cellular, non-combustible, heat-insulating material, comprising the molded and subsequently dried and burned product resulting from the mixture of prepared wet peat and plastic clay; said peat consisting of peat which has been heated under pressure greater than atmospheric, in an alkaline water containing a sufficient amount of alkali to neutralize the peat acids and leave the peat alkaline, to a temperature higher than 200 degrees Fahrenheit and subsequently drained and pressed free of excess water.

5. A solid, cellular, non-combustible, heat-insulating material, comprising the molded and subsequently dried and burned product resulting from the intimate mixture and maceration of plastic clay, well-macerated plastic peat containing more than fifty per cent of moisture, and sufficient alkali to make the mass workable.

6. A solid, cellular, non-combustible, heat-insulating material, comprising the molded and subsequently dried and burned product resulting from the intimate mixture and maceration of plastic clay, well-macerated peat containing more than fifty per cent of moisture, and sufficient alkali to make the mass workable but not sufficient to leave an appreciable excess of alkali in the finished product.

7. A solid, cellular, non-combustible, heat-insulating material, comprising the molded, dried and subsequently heated mass resulting from mixing into a plastic mass and macerating, peat and a refractory material which has the property of setting to a solid upon drying, and a small percentage of an alkaline silicate, sufficient water being added to make the whole workable.

8. A solid, cellular, non-combustible, heat-insulating material, comprising the molded, perforated, dried and subsequently burned product resulting from incorporating prepared alkaline peat in a plastic clay in amounts less than fifty per cent of the weight of the mixture on the dry-weight basis.

9. A solid, cellular, non-combustible, heat-insulating material, comprising the molded, perforated, dried and subsequently burned product resulting from the mixture of peat, clay, water and an alkali in proportions which yield a workable plastic mass.

10. The process of making a solid, cellular, non-combustible, heat-insulating material from clay as a base, consisting in, pugging in a clay working machine both plastic clay and peat with sufficient water and sodium silicate to make the mass workable as a plastic, the peat being present in lesser amounts than the clay, extruding the plastic mass resulting therefrom through an orifice, shaping it into forms of desired size, drying said forms and subsequently heating them to a suitably high temperature whereby the peat is substantially consumed by combustion and a solid cellular refractory remains, and subsequently cooling said heated forms.

11. The process of making a solid, cellular, non-combustible, heat-insulating material from clay as a base, consisting in, pugging in a clay working machine both plastic clay and peat with sufficient water and sodium silicate to make the mass workable as a plastic, the peat being present in lesser amounts than the clay, extruding the plastic mass resulting therefrom through an orifice, shaping it into forms of desired size, perforating said forms with closely spaced small perforations, drying said forms and subsequently heating them to a suitably high temperature whereby the peat is substantially consumed by combustion and a solid cellular refractory remains, and subsequently cooling said heated forms substantially as described.

12. The process of making a solid, cellular, non-combustible, heat-insulating material from clay as a base, consisting in macerating a mass of wet peat containing added sodium silicate in a suitable macerator until a plastic mass is formed, adding the macerated peat to a plastic clay in a suitable clay-working machine, less peat being present than clay, pugging the mixture until the peat is thoroughly incorporated in the clay, extruding the resulting mass through an orifice, shaping it into forms of suitable size, drying the forms, heating the dried forms to a suitably high temperature for the consumption of the peat by combustion and the formation of a hard product, and subsequently cooling the hard product formed.

13. The process of making a solid, cellular, non-combustible, heat-insulating material from clay as a base, consisting in, adding wet, prepared, alkaline peat to a plastic clay in a suitable clay-working machine, incorporating said peat in said clay by pugging it, extruding the resulting mass through an orifice, shaping it into suitable forms, drying the forms and subsequently heating them to a temperature approaching the softening point of the clay for a sufficiently long time to burn substantially all of the incorporated peat, and finally cooling the heated forms in a suitable manner.

14. The process of making a solid, cellular, non-combustible, heat-insulating material from clay as a base, consisting in, adding wet, prepared, alkaline peat to a plastic clay in a suitable clay-working machine, incorporating said peat in said clay by pugging it, extruding the resulting mass through an orifice, shaping it into suitable forms, perforating said forms in a suitable manner with closely spaced small perforations, drying the forms and subsequently heating them to a temperature approaching the softening point of the clay for a sufficiently long time to burn substantially all of the incorporated peat, and finally cooling the heated forms in a suitable manner.

15. The process of making a solid, cellular, non-combustible, perforated, heat-insulating material from clay as a base, consisting in, thoroughly macerating a mixture of plastic clay and peat in a suitable macerator, sufficient water and sodium silicate being added to make the mass plastic, shaping the macerated mass into suitable forms in a suitable manner and perforating them, said perforations being small and closely spaced, drying the forms and subsequently heating them in a suitable manner in an atmosphere containing oxygen, and removing the peat by the combustion thereof, and finally slowly cooling the heated forms.

16. The process of making a solid, cellular, non-combustible, perforated, heat-insulating material from clay as a base, consisting in, thoroughly macerating a mixture of plastic clay and peat in a suitable macerator, sufficient water and alkali being added to make the mass plastic, shaping the macerated mass into suitable forms in a suitable manner and perforating them, said perforations being small and closely spaced, drying the forms and subsequently heating them in a suitable manner in an atmosphere containing oxygen, and removing the peat by the combustion thereof, and finally slowly cooling the heated forms.

17. In the process of making a solid, cellular, perforated, non-combustible, heat-insulating material from clay as a base, as described in claim 16, in combination, the steps consisting in, thoroughly macerating the peat and clay together in a suitable macerator and subsequently shaping the macerated mass into perforated forms of suitable size in a suitable manner, the perforations being small in size but closely spaced.

18. The process of making a solid, cellular, non-combustible perforated heat-insulating material from a non-combustible cementing material and peat, consisting in, macerating together in a suitable macerator the cementing material and wet peat with sufficient water to make the whole a plastic mass, shaping the plastic mass into suitable perforated forms in a suitable manner, drying the shapes, subsequently heating them in a suitable oven in an atmosphere containing oxygen to a predetermined temperature and finally slowly cooling the heated forms in a suitable manner.

WILLIAM W. ODELL.